No. 648,626. Patented May 1, 1900.
C. E. MACBETH.
SHEARS FOR SHAPE IRON.
(Application filed Jan. 10, 1900.)

(No Model.)

Witnesses:
E. R. Shipley.
M. S. Belden.

Charles E. Macbeth
Inventor
by James W. See
Attorney

UNITED STATES PATENT OFFICE.

CHARLES E. MACBETH, OF HAMILTON, OHIO, ASSIGNOR TO THE LONG & ALLSTATTER COMPANY, OF SAME PLACE.

SHEARS FOR SHAPE-IRON.

SPECIFICATION forming part of Letters Patent No. 648,626, dated May 1, 1900.

Application filed January 10, 1900. Serial No. 954. (No model.)

*To all whom it may concern:*

Be it known that I, CHARLES E. MACBETH, a citizen of the United States, residing at Hamilton, Butler county, Ohio, (post-office address, corner Fourth and High streets, Hamilton, Ohio,) have invented certain new and useful Improvements in Shears for Shape-Iron, of which the following is a specification.

This invention pertains to shears for cutting off bars of metal of various cross-sectional shapes.

The invention is illustrated as adapted for the shearing of T-bars, such exemplifying bar representing a shape heretofore presenting serious difficulties in shearing without distortion, the difficulty being due to the crushing of one member while another member is being sheared. Heretofore attempts have been made to meet the difficulty by separate operations or by the use of shears involving separable loose shear elements—that is to say, in conjunction with one of the shear-blades there would be employed a removable section for that blade.

My improvement will be readily understood from the following description, taken in connection with the accompanying drawings, in which—

Figure 1:
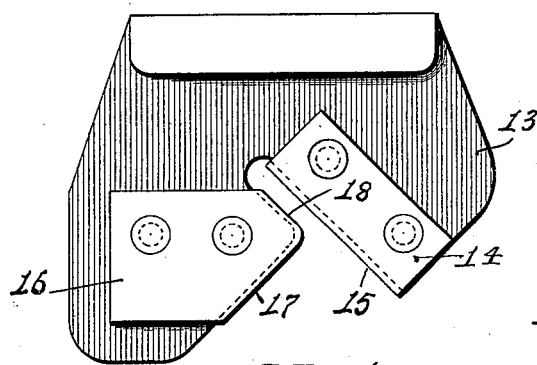
Figure 2:
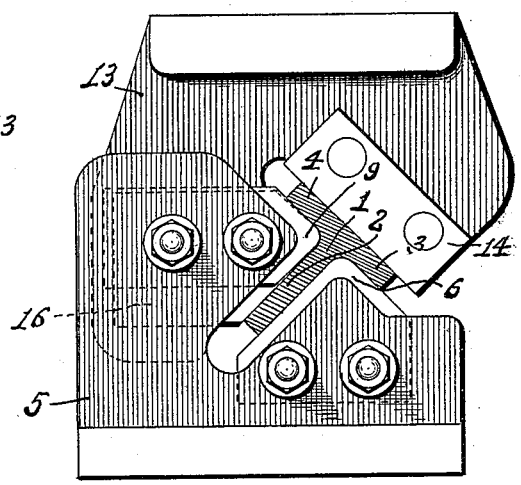

Figure 1 is a face view of a pair of shears exemplifying my invention and adapted for the shearing of T-bars, the two shear members being shown abnormally separated; Fig. 2, a similar view, but showing the two shear members in proper relationship for the reception of the bar to be sheared and just ready to begin the shearing operation, the bar operating in vertical transverse section; and Fig. 3, a side view of the shears in the same relationship to each other as in Fig. 2, but with the bar omitted.

In the drawings, 1 indicates the exemplifying bar to be sheared, the same being of T-shaped cross-section; 2, its web; 3, one of its flanges; 4, its other flange, the flanges 3 and 4 being in the same plane and constituting what might be called the "head" of the bar; 5, the lower shear-block, the same being adapted for attachment to the bed-jaw of an ordinary shearing-machine; 6, the lower shear-blade, rigidly secured to shear-block 5 and having its upper or active portion conforming to the lower surfaces of web 2 and flange 3 of the bar, it being observed that the bar is so disposed that all of its surfaces are at an angle to the vertical, it being assumed that the shearing action takes place in a vertical direction; 7, that active shearing edge of shearing-blade 6 which engages below flange 3 of the bar; 8, that active shearing edge of shear-blade 6 which engages below web 2 of the bar, edges 7 and 8 joining and forming, in effect, a single angular shear-blade below the bar; 9, a superlower shear-blade secured to lower shear-block 5 and presenting an end under the flange 4 of the bar, the rear or shearing face of blade 9 being in the same plane with that of blade 6; 10, the active shearing edge of blade 9, the same being some distance over edge 8 of the lower shear-blade and accurately conforming to the under surface of flange 4 of the bar; 11, an inactive edge of superlower blade 9, the same coming over web 2 of the bar and clearing the same to any desired extent consistent with proper strength of the blade; 12, bolts securing the blades to the shear-blocks, preferably engaging slotted holes, so as to permit adjustment of the blades upon the blocks, all of the shear-blades of the system being by preference similarly secured to the blocks; 13, the top shear-block, adapted to be attached to the upper jaw of the shearing-machine; 14, the top shear-blade, secured to the top shear-block over blades 6 and 9, its front or shearing face being in the plane of the rear face of blocks 6 and 9; 15, the active shearing edge of top shear-block 14, the same conforming to the top surface of flanges 3 and 4 of the bar; 16, the subtop shear-blade, secured to the top shear-block below a portion of top shear-blade 14, its front or shearing face being in the same plane as that of top shear-blade 14; 17, the active shearing edge of subtop shear-blade 16, the same conforming to the upper surface of web 2 of the bar, and 18 the inactive edge of subtop shear-blade 16, the same coming under flange 4 of the bar and clearing the same to any desired extent consistent with stiffness of the blade.

Figure 3:
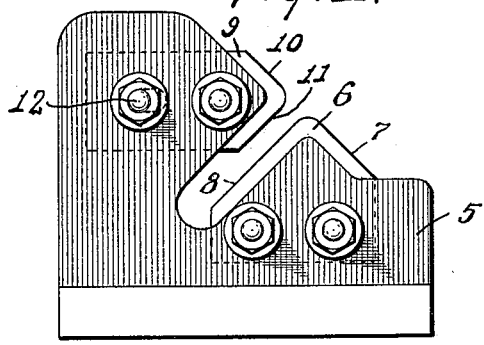
Figure 3:
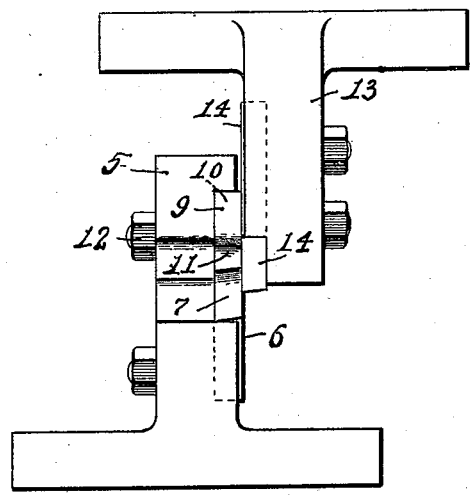

Normally the parts have the relative position indicated in Figs. 2 and 3. When in this position, the parts are at rest, and the spaces between the shear-blades are such as to readily admit the bar, which finds firm and accurate vertical support on lower shear-blade 6 and sublower shear-blade 9, top shear-blade 14 and subtop shear-blade 16 being over the members of the bar which they are to shear. When shear-block 13 descends, carrying with it its two shear-blades 14 and 16, top shear-blade 14 shears the flanges of the bar against opposing shear-blades 6 and 9, subtop shear-blade 16 at the same time shearing the web of the bar against opposing shear-blade 6, there being a clean cut with no distortion of the shape of the bar.

It is to be understood that the terms "top," "lower," "vertical," &c., are employed in the relative sense only, it being obviously quite immaterial whether the shear members be arranged one over the other for vertical shearing or one at the side of the other for horizontal shearing or which of the shear members is the movable one.

By forming the shear-blades as separate pieces and adjustably securing them to the shear-blocks provision is made for adjusting them to suit various dimensions of the bars to be sheared, the separable system also providing for convenience and economy in construction and repair of the blades. Aside from these considerations it is obvious that blades 14 and 16 instead of being rigidly united by means of the shear-block might be rigidly united by being formed integrally and similarly as to blades 6 and 9.

By inspecting Fig. 1 it will be observed that when the bar is placed in position for shearing it is supported by upwardly-presenting shearing-surfaces which are themselves rigidly supported. Super-lower shear-blade 9 engages under flange 4 of the bar and supports the bar by the shearing edge 10. Blade 9 is rigidly supported and exerts no downward pressure upon the bar, edge 11 of blade 9 being an inactive edge and standing free of the bar. Attempts have been made to do shearing of this kind by the employment of a portable lower shear-blade, itself supported by an inactive edge resting on the stock, the arrangement being much as though blade 9 were a loose piece upwardly supported by having its inactive edge 11 resting on the bar, such loose blade having a crushing effect upon that portion of the bar which supports it. My invention is to be distinguished from such arrangement in that in my invention there is no portable blade supported by contact with the stock being sheared.

I claim as my invention—

In a shear, the combination, substantially as set forth, of a lower shear-blade having an upwardly-presenting shear edge, a sublower shear-blade disposed above said lower shear-blade and having an upwardly-presenting shearing edge, said lower and sublower shear-blades being rigidly unified and having their shearing-faces in a common plane, a top shear-blade having a lower shearing edge adapted to coöperate with said lower and sublower blades, and a subtop shear-blade having a downwardly-presenting shearing edge adapted to coöperate with said lower shear-blade, said top and subtop shear-blades being rigidly unified and having their shearing-faces in the shearing plane of said lower and sublower blades, the non-shearing edges of said blades clearing the stock or bar being sheared, so that the stock or bar is engaged only by the shearing edges of the blades.

CHARLES E. MACBETH.

Witnesses:
J. W. SEE,
FRANK P. RICHTER.